United States Patent
Huber et al.

(10) Patent No.: US 7,905,556 B2
(45) Date of Patent: Mar. 15, 2011

(54) BRAKING DEVICE FOR A RAIL VEHICLE

(75) Inventors: Jürgen Huber, München (DE); Andreas Gaag, Beilngries (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 1204 days.

(21) Appl. No.: 10/558,290

(22) PCT Filed: May 27, 2004

(86) PCT No.: PCT/EP2004/005689
§ 371 (c)(1),
(2), (4) Date: Aug. 2, 2006

(87) PCT Pub. No.: WO2004/106132
PCT Pub. Date: Dec. 9, 2004

(65) Prior Publication Data
US 2007/0096552 A1    May 3, 2007

(30) Foreign Application Priority Data
May 28, 2003  (DE) ................................. 103 24 438

(51) Int. Cl.
*B60T 13/22*    (2006.01)
(52) U.S. Cl. ............ 303/71; 303/9.76; 303/15; 303/127; 188/170

(58) Field of Classification Search ............ 303/127, 303/115.1, 7, 9, 15, 9.76, 71; 188/170
See application file for complete search history.

(56) References Cited

U.S. PATENT DOCUMENTS

| | | | | |
|---|---|---|---|---|
| 3,929,381 A * | 12/1975 | Durling | ...................... | 303/118.1 |
| 4,003,606 A | 1/1977 | Plantan | | |
| 4,163,585 A * | 8/1979 | Ury | .................................... | 303/9 |
| 4,575,158 A * | 3/1986 | Grunert et al. | ................... | 303/57 |
| 4,575,159 A * | 3/1986 | Emilsson | ........................ | 303/71 |
| 5,118,165 A * | 6/1992 | Latvala | ........................ | 303/9.76 |
| 5,393,130 A | 2/1995 | Graham | | |
| 6,312,060 B1 | 11/2001 | Zhou et al. | | |
| 6,325,464 B2 * | 12/2001 | Truglio et al. | ..................... | 303/7 |
| 6,655,750 B2 * | 12/2003 | Soupal | .............................. | 303/9 |

FOREIGN PATENT DOCUMENTS
DE    3605444 A1 *  9/1986 ........................ 303/7

* cited by examiner

Primary Examiner — Robert A Siconolfi
Assistant Examiner — Mariano Sy
(74) Attorney, Agent, or Firm — Barnes & Thornburg LLP

(57) ABSTRACT

A brake device of a rail vehicle includes at least one spring-loaded cylinder having a pressure port and at least one service brake cylinder having a pressure port configured to receive a service brake pressure. Further included is a control valve arrangement having at least three ports, wherein a first port is connected to the pressure port of the spring-loaded cylinder and the control valve arrangement is configured to connect the first port to one of the following: (1) a second port configured to receive a pressure derived from a first pressure reservoir; and (2) a third port.

6 Claims, 1 Drawing Sheet

BRAKING DEVICE FOR A RAIL VEHICLE

BACKGROUND AND SUMMARY

The present disclosure relates to a brake device of a rail vehicle.

Other aspects of the present disclosure will become apparent from the following descriptions when considered in conjunction with the accompanying drawings.

DETAILED DESCRIPTION

Figure 1:
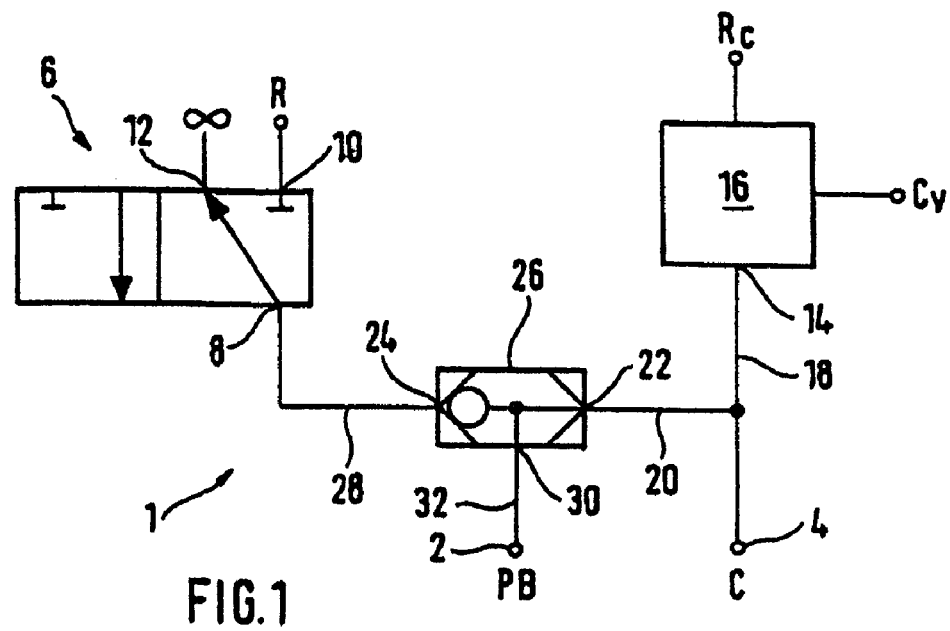
FIG. 1 is a schematic diagram of a prior art brake device of a rail vehicle.

A functional diagram of a brake device of a bogie known from the prior art is illustrated in FIG. 1. The known brake device 1 contains a spring-loaded cylinder (not illustrated for reasons of scale) with a pressure port 2 at which a spring-loading pressure PB is applied, a service brake cylinder (not illustrated) with a pressure port 4 to which a service brake pressure C can be applied, and a control valve arrangement 6. The control valve arrangement is formed by a 3/2-way solenoid valve 6 with three ports 8, 10, 12 and two switched positions. The first port 8, which is connected to the pressure port 2 of the spring-loaded cylinder, is capable of being connected to the second port 10, to which a pressure R which is derived from a pressure reservoir can be applied, or to the third port which is a venting port 12 which is connected to the atmosphere. The pressure port 4 of the service brake cylinder is connected to a pressure outlet 14 of a relay valve arrangement 16 which generates the service brake pressure C, as a function of a control pressure Cv, from a reservoir pressure Rc which is derived from a pressure reservoir. A line section 20 branches off from a line 18 connecting the pressure outlet 14 of the relay valve 16 to the pressure port 4 of the service brake cylinder and opens into one of two inlets 22, 24 of a shuttle valve 26. The inlet 24 of the shuttle valve 26 is connected via a line 28 to the first port 8 of the 3/2 way valve 6, while the outlet 30 is connected to the pressure outlet 2 of the spring-loaded cylinder via a line 32. The shuttle valve 26 is embodied in a known fashion in order to connect the larger of the pressures present at its two inlets 22, 24 to its outlet 30. The spring-loaded cylinder is a passive brake cylinder which is released by increasing pressure and activated by reducing the pressure, while the service brake cylinder is an active brake cylinder in which an increase in pressure causes the brake to be activated, and a reduction in pressure causes the brake to be released. The service brake cylinder and the spring-loaded cylinder both act on a common brake mechanism (not shown for reasons of scale), for example a brake caliper, which is fitted with brake linings which can be pressed onto a brake disk.

A rail vehicle which is equipped with such a brake device 1 is now to be described as being braked starting from a state in which both the service brake cylinder and the spring-loaded cylinder are released. So that the spring-loaded cylinder and the service brake cylinder are firstly released, the 3/2-way valve 6 must be connected in such a way that the first port 8 is connected to the second port 10 and the third port 12 is shut off. The release pressure R is then present in the line 28, while the relay valve 16 vents the line 18 which is connected downstream of it so that the service brake pressure C is low. As a result, the shuttle valve 26 which is loaded both by the low service brake pressure C and by the high reservoir pressure R connects through the latter to the spring-loaded cylinder as the release pressure PB in order to hold the spring-loaded brake in the released state.

If the rail vehicle is to be braked and securely stabled starting from this state, the service brake pressure C is increased by correspondingly actuating the relay valve 16, the service brake cylinder is activated and the rail vehicle is brought to a stop. The 3/2-way valve 6 is moved into the position shown in FIG. 1 in which the first port 8 is connected to the venting port 12. This results in the pressure in the line 28 dropping. As a result, the service brake pressure C which is now increased by correspondingly actuating the relay valve 16 passes through to the shuttle valve 26 and via the line 32 to the spring-loaded cylinder and holds it in the release position while it continues to activate the service brake cylinder and as a result prevents the rail vehicle from rolling. Consequently, the shuttle valve 26 ensures that the brake mechanism is always activated either by the service brake cylinder or by the spring-loaded cylinder, but never by both at the same time since otherwise the brake mechanism which has a limited fatigue strength would be overloaded. However, such shuttle valves 26 often operate unreliably, in particular when there are small pressure differences at the two inlets 22, 24.

In contrast, the present disclosure is based on developing a brake device in such a way that it operates more reliably and can be manufactured more cost effectively.

This present disclosure relates to a brake device 34 of a rail vehicle. The brake device 34 includes at least one spring-loaded cylinder 36 having a pressure port 38. Also included is at least one service brake cylinder 40 having a pressure port 42 configured to receive a service brake pressure C. Further included is a control valve arrangement 52 including at least three ports 54, 56, 58. The first port 54 is connected to the pressure port 38 of the spring-loaded cylinder 36. The control valve arrangement 52 is configured to connect the first port 54 to one of the following: (1) the second port 56, which is configured to receive a pressure R derived from a first pressure reservoir 70; and, (2) the third port 58. The third port 58 is connected to the pressure port 42 of the service brake cylinder 40.

Figure 2:
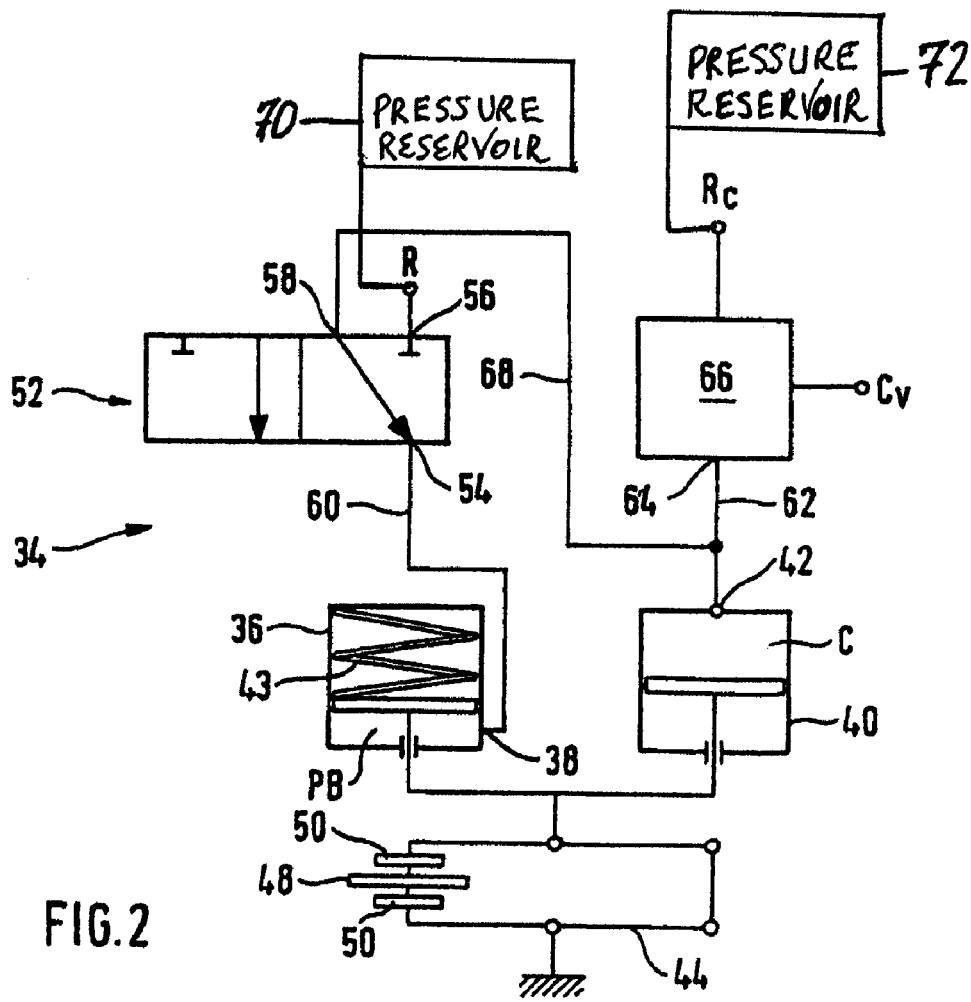
FIG. 2 is a schematic of a brake device of a rail vehicle, according to the present disclosure.

As shown in FIG. 2, since the third port 58 of the control valve arrangement 52 is connected to the pressure port 42 of the service brake cylinder 40, it is possible to dispense with the shuttle valve 26 completely. Dispensing with the shuttle valve 26 ensures, on the one hand, that the fabrication costs are reduced markedly against the background of the large numbers of bogie brakes in the field of rail vehicles, and on the other hand that reliability is increased. The function of the shuttle valve 26 will now be performed as a double function by the control valve arrangement 52 which is present in any case, so that the number of components of the brake device 34 is reduced.

A method of functioning of the brake device 34, according to the present disclosure becomes clear from tan embodiment shown in FIG. 2.

As noted above, the brake device 34 shown in FIG. 2 serves to brake a bogie of a rail vehicle and includes a spring-loaded cylinder 36 with a pressure port 38 to which a spring-loading pressure PB can be applied and a service brake cylinder 40 with a pressure port 42 to which a service brake pressure C can be applied.

The spring-loaded cylinder 36 may be, for example, a passive brake cylinder which is released counter to the effect of its storage spring 43 by increasing the pressure and activated by reducing the pressure. In contrast, the service brake cylinder 40 may be an active brake cylinder in which an increase in pressure causes the brake to be activated, and a reduction in pressure causes the brake to be released. Alternatively, the spring-loaded cylinder 36 may be an active brake cylinder, and the service brake cylinder 36 may be a passive brake cylinder. It is decisive that the two brake cylinders operate in opposite directions when there are changes in pressure. The service brake cylinder 40 and the spring-loaded cylinder 36 both act on a common brake mechanism, for example a brake caliper 44, which is fitted with brake linings 50 which can be pressed against a brake disk 48.

The control valve arrangement 52 may be formed by a 3/2-way solenoid valve 52 with the three ports 54, 56, 58 and two connected positions. The first port 54, which is connected via a line 60 to the pressure port 38 of the spring-loaded cylinder 36, is capable of being connected to the second port 56. The second port 56 may be assigned a pressure R, which is derived from a pressure reservoir 70. The second port 56 is assigned to the spring-loaded cylinder 36. The first port 54 is able to also be connected to the third port 58. The 3/2-way valve 52 may be a solenoid valve which is actuated electrically by a control device (not illustrated). Alternatively, it is possible to use any further valves which fulfill the same function, such as an impulse valve (not shown).

The pressure port 42 of the service brake cylinder 40 is connected via a further line 62 to a pressure outlet 64 of a relay valve arrangement 66 which generates the service brake pressure C, as a function of a control pressure Cv, from a reservoir pressure Rc which is derived from a pressure reservoir 72. A further line 68, which is connected to the third port 58 of the 3/2-way valve 52, branches from this line 62. Instead of the relay valve arrangement 66, the service brake pressure C could also be derived by any desired control valve, for example, by a load brake valve, by a combination of a plurality of such valves or directly from the reservoir pressure Rc.

The rail vehicle will now be described as being braked starting from a travel state, and then parked. In the travel state, both the service brake cylinder 40 and the spring-loaded cylinder 36 must be released, i.e. the 3/2-way valve 52 must be switched in such a way that the first port 54 is connected to the second port 56 and the third port 58 is shut off. The pressure R, which is derived from the reservoir of the spring-loaded cylinder 36, is then present as release pressure in the line 60 which leads to the spring-loaded cylinder 36, and said pressure holds it in the released position counter to the effect of the storage spring 43. At the same time, the relay valve arrangement 66 vents the line 62, which is arranged downstream of it, so that the service brake pressure C is so low that the service brake cylinder 40 cannot be activated. Since the third port 58 of the 3/2-way valve 52 is shut off, it is, however, not possible for this low service brake pressure C to be connected through to the spring-loaded cylinder 36 which therefore remains in the release position.

If braking is to be initiated starting from the travel state by activating the service brake, the 3/2-way valve 52 is adjusted to the connected position shown in FIG. 2 in which the first port 54 is connected to the third port 58 and the second port 56 is shut off. This results in the service brake pressure C, which is increased by correspondingly actuating the relay valve arrangement 66, to be present via the line 68 at the third port 58 of the 3/2-way valve 52, and to be connected through and by the 3/2-way valve 52 and to pass via the line 60 to the spring-loaded cylinder 36 in order to hold it in the released position. Furthermore, the increase in the service brake pressure C causes the service brake cylinder 40 to be activated and thus brings the rail vehicle to a standstill. The activated service brake cylinder 40 then forms the parking brake at the same time.

If the service brake pressure C drops after some time owing to partially unavoidable leakages, the service brake cylinders 40 are released. However, at the same time, the spring-loaded cylinder 36 is activated because it has the service brake pressure C applied to it via the line 68, via the 3/2-way valve 52 connected as shown in FIG. 2, and via the line 60. The service brake pressure C is no longer capable of holding the spring-loaded cylinder 36 in the released state counter to the effect of the storage spring 43. Consequently, the spring-loaded cylinder 36 then performs the function of the parking brake, with the parking brake force being applied by the storage spring 43. Furthermore, the above-described connections also ensure that either only the spring-loaded cylinder 36 or the service brake cylinder 40 activates the brake caliper 44.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A brake device of a rail vehicle comprising:
   at least one spring-loaded cylinder including a pressure port;
   at least one service brake cylinder including a pressure port configured to receive a service brake pressure;
   a control valve arrangement including a 3/2-way solenoid valve having at least three ports, wherein a first port is connected to the pressure port of the spring-loaded cylinder and the control valve arrangement is configured to connect the first port to one of the following: (1) a second port configured to continuously receive a pressure derived from a first pressure reservoir, and (2) a third port; and
   wherein the third port is connected to the pressure port of the service brake cylinder.

2. The brake device of claim 1, wherein the pressure port of the service brake cylinder is connected to a pressure outlet of a relay valve arrangement, the relay valve arrangement generating a service brake pressure as a function of a control pressure from a reservoir pressure which is derived from a second pressure reservoir.

3. The brake device of claim 1, wherein the spring-loaded cylinder is a passive brake cylinder, and the service brake cylinder is an active brake cylinder.

4. The brake device of claim 1, wherein the spring-loaded cylinder is an active brake cylinder and the service brake cylinder is a passive brake cylinder.

5. The brake device of claim 1, wherein the first port is configured to be continuously connected to the spring-loaded cylinder.

6. The brake device of claim 1, wherein the third port is configured to be continuously connected to the service brake cylinder.

* * * * *